United States Patent [19]

Haigh et al.

[11] Patent Number: 4,788,405
[45] Date of Patent: Nov. 29, 1988

[54] WELD THICKNESS MONITORING IN RESISTANCE WELDING APPARATUS

[75] Inventors: Stephen J. Haigh, Cholsey; Martin J. Melville, Sparsholt, both of United Kingdom; Martin J. Melville, both of Oxfordshire, United Kingdom

[73] Assignee: Metal Box Public Limited Company, Reading, United Kingdom

[21] Appl. No.: 54,583

[22] Filed: May 27, 1987

[30] Foreign Application Priority Data

May 30, 1986 [GB] United Kingdom ............... 8613130

[51] Int. Cl.⁴ .......................................... B23K 11/24
[52] U.S. Cl. ...................................... 219/109; 219/82
[58] Field of Search ................ 219/64, 81, 82, 83, 219/84, 109, 110

[56] References Cited

U.S. PATENT DOCUMENTS

| | | | |
|---|---|---|---|
| 2,332,289 | 10/1943 | Zeitlin | 80/56 |
| 4,376,883 | 3/1983 | Dao et al. | 219/109 |
| 4,548,503 | 10/1985 | Liesch et al. | 356/373 |
| 4,628,175 | 12/1986 | Nissl | 219/109 |

FOREIGN PATENT DOCUMENTS 2083235 9/1980 United Kingdom .
2139361 9/1980 United Kingdom .

*Primary Examiner*—Clifford C. Shaw
*Attorney, Agent, or Firm*—Christie, Parker & Hale

[57] ABSTRACT

Apparatus, for measuring the thickness of a welding seam produced by resistance welding between a resiliently mounted upper roll and a lower roll, comprises a source of light mounted laterally of the resiliently mounted roll and a light collector mounted to receive such light as is not eclipsed by the periphery of the roll so that variation in the amount of light received as the roll periphery interrupts the light is indicative of weld thickness. The light received is preferably converted by means to an electrical signal which is analyzed to discern the quality of the weld.

19 Claims, 4 Drawing Sheets

WELD THICKNESS MONITORING IN RESISTANCE WELDING APPARATUS

BACKGROUND OF THE INVENTION

1. Field of the Invention

This invention relates to the resistance welding apparatus for welding for example the longitudinal seams of the bodies of containers such as are conventionally used for packaging food and aerosol products. In particular, but not exclusively the invention is concerned with resistance welding apparatus of the kind having electrodes in the form of opposed wheels between which may be passed the overlapped margins of a metal body blank bent to tubular form, and to which electric current may be supplied to weld the margins together as the required body seam.

2. Description of the Prior Art

In the past, various attempts have been made to monitor the weld achieved by such an apparatus as it is being formed, so as to enable container bodies with substandard welds to be rejected, to enable one or more parameters of the welding process to be controlled by closed or open loop control, and/or for data logging or indication purposes. In our British patent specifications No. 2083235B and 2139361B there is described and claimed one such monitoring system, in which the desired signal is derived from repeated integration of the weld voltage during welding.

Although representing a considerable advance over the resistance weld monitoring systems available hitherto the systems described in the above-mentioned British patent specifications gave only a partial picture of the welding process, and attempts have since been made to use other parameters in addition as an indication of weld quality.

Known apparatus for resistance welding the seams of can bodies are the welding machine marketed by Soudronic AG under their series designation FBB. In those machines two electrode wheels are mounted one above the other as a cooperating pair, the upper wheel being driven by an associated motor.

The blank margins destined to form the welded seam are overlapped with one another and presented to the nip between the electrode wheels by what is commonly referred to as a "Z-bar" because of its Z shaped cross-sectional profile. The Z-bar and the lower electrode wheel are mounted virtually immovably in relation to one another from the machine frame; the upper electrode wheel, however, is vertically immovable and biased downwardly by a compression spring so that the upper electrode wheel exerts a substantially constant welding pressure on the formative seam as welding proceeds.

In an FBB series machine potentially one of the most useful parameters to use as an indication of weld quality is the vertical position of the upper electrode wheel, since any variation in the thickness of the can body seam must cause a substantially equal vertical bodily movement of that wheel.

An attempt to sense the position of the axis or shaft of the upper electrode wheel, by means of a transducer sensing the movement of the axis and producing an electrical signal indicative of position, gave inaccurate measurements of weld thickness. This was because eccentric movement of the wheel relative to the axis produced a signal component which masked the signal component representative of variations in weld thickness. This prior art method is therefore limited in value.

Applicants believe that by suitable choice of methods and apparatus a signal can be derived which is more accurately representative of the weld thickness than has hitherto been possible.

SUMMARY OF THE INVENTION

According to the present invention there is provided resistance welding apparatus comprising a pair of cooperating electrodes located on opposite sides of a path along which a workpiece is to be displaced the electrodes being urged towards one another, characterised by a datum member constrained in a fixed positional relationship with one said electrode and located facing the outer surface of the other electrode to define a gap between the said outer surface and the datum member, the said outer surface being faced, being inclined to a line extending perpendicular to the path where it passes between the electrodes whereby the size of the said gap will vary as a function of the instantaneous thickness of the workpiece between the electrodes and monitoring means for monitoring the size of said gap and thereby the thickness of said workpiece.

According to the present invention there is further provided resistance welding apparatus comprising first and second mutually co-operable electrodes said first electrode being arcuate and immovable in bodily position and said second electrode being a resiliently mounted rotary electrode wheel guided for movement towards and away from the first electrode characterised by means for sensing the displacement of the periphery of the second electrode at a position where the periphery is inclined to the direction of movement of the second electrode and generating a signal which is a function of the relative displacement between the electrodes and therefore also a function of weld thickness present between the electrodes.

Although of particular application to a resistance seam welding machine such as an FBB series Soudronic machine, the invention may be used for other resistance welding apparatus employing wheel electrodes one of which is immovably mounted and the second of which is resiliently mounted. In apparatus such as the XYZ 1234 machine having copper wire as an intermediate electrode to reduce contamination of the electrode wheels by tin during the welding of tinplate blanks, the periphery of the wheel as sensed may be formed by the intermediate wire electrode rather than by the electrode wheel itself; however, by sensing the displacement at a sensing position which is closely adjacent the nip between the electrode wheels, the signal obtained may be made substantially independent of thickness variations of the wire passing round the movable wheel electrode. On the other hand, a sensing position remote from the immovable wheel may be preferred for some applications.

BRIEF DESCRIPTION OF THE DRAWINGS

Resistance welding apparatus embodying the present invention will now be described, by way of example, with reference to the accompanying diagrammatic drawings in which.

DESCRIPTION OF THE PREFERRED EMBODIMENTS

Figure 1:
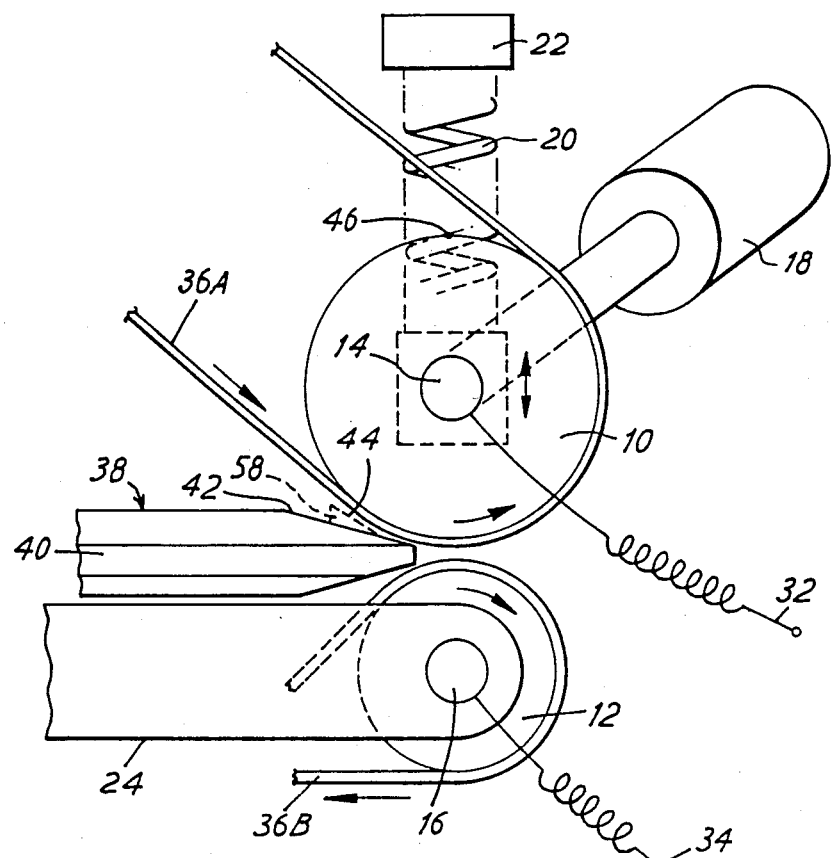
FIG. 1 diagrammatically shows in side elevation a part of a resistance welding apparatus for welding the longitudinal seams of tinplate bodies for food containers, and employing cooperating upper and lower electrode wheels.

Referring now to FIG. 1, part of a resistance welding apparatus is shown diagrammatically in side elevation to comprise upper and lower electrode wheels 10, 12 rotatable about respective horizontal axes 14, 16. The upper wheel is driven for rotation by an electrode motor 18. It is mounted so as to be capable of limited vertical movement towards and away from the lower wheel, being biassed downwardly towards the limiting position shown by a compression spring 20 having its upper end located by a member 22 of the machine frame.

The lower wheel is mounted for free rotation on the free end of a rigid but cantilevered arm 24 which is supported from the machine frame at its left hand end as shown; the lower wheel can therefore be considered as being fixed bodily in position.

Figure 2:
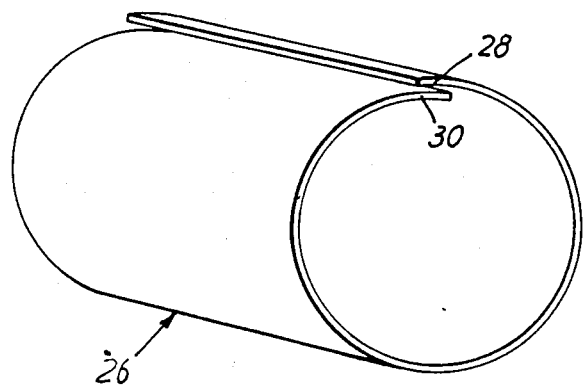
FIG. 2 shows a tubular blank for one of the container bodies, as it appears when entering the nip between the electrode wheels of the apparatus.

The machine is designed for welding seams in rectangular metal blanks and includes means at the left hand end of the arm 24 for bending them to the tubular form shown in FIG. 2. The blanks 26 in this form pass in quick succession along the arm from left to right, with a small separation between adjacent blanks. From FIG. 2 it will be seen the blanks 26 have their longitudinally extending margins 28, 30 overlapped with one another and located along the top of the blank as it passes along the arm.

The electrode wheels are electrically conductive and have associated electrical connections 32, 34 by which an electric current may be passed between them.

In known manner each blank in succession is fed from the arm 24 and into the nip between the wheels, and its overlapped margins 28, 30 are fused together by resistive heating to form a seam along the blank, which accordingly becomes a tubular body for an aerosol (or other) container.

In order to protect the electrode wheels 10, 12 from contamination from tin etc. coatings of the blank and to reduce wheel wear, the wheels themselves are not required to contact the blanks 26. Electrical contact with the blanks is instead made by a sacrificial copper wire 36 forming an intermediate electrode for each of the electrode wheels. The wire is moved through the machine around a complex path between feed and take-up devices (not shown); in the vicinity of the wheels 10, 12 being respectively denoted by the reference numerals 36A, 36B and moving as shown in the direction of the arrows.

In order to ensure the required overlapped relationship of the blank margins 28, 30 as the blank passes along the arm 24 and they enter the nip between the electrode wheels, each margin is received in a respective contoured groove formed along a bar 38 which is mounted from the machine frame to extend above and along the arm 24. The groove for the lower blank margin 30 is shown and indicated in FIG. 1 by the reference numeral 40, and it is to be understood that a corresponding groove (not shown) is provided for the blank margin 28 on the side of the bar 38 opposite to the side which is visible. This second groove is located above and in laterally overlapped relationship with the groove 40, so that the bar has a generally Z-shaped cross-section.

The two grooves in the Z-bar 38 form guideways for the blank margins as the blank moves along the arm 24 and to ensure close control of the relative positions of the margins as they enter the nip between the electrode wheels 10, 12 the Z-bar is extended as far as is practicable into the cuspate throat formed between the electrode wheels immediately upstream of the welding location. The terminal end of the Z-bar accordingly is generally wedge-shaped and in particular has a top inclined surface 42 which is in close proximity to the underside of the upper electrode wheel 10. The surface 42 and the adjacent part of the wire electrode 36A accordingly form an optical slit (denoted 44) of which the width will vary substantially in accordance with the thickness of a container body seam being formed between the electrode wheels. In passing it will be noted that because the optical slit is defined by the same, lower, surface of the wire 36A which is to make contact with the top of the formative seam, its width will be substantially independent of any variation in the thickness of the wire 36A.

As is shortly to be explained, the slit 44 is one site which may be employed for obtaining a signal representative of the vertical position of the upper electrode wheel. A further possible site for obtaining a position-dependent signal is at the top of the wheel, as indicated by the reference numeral 46. It will be seen that this site is free of the electrode wire 36A.

Figure 3A:
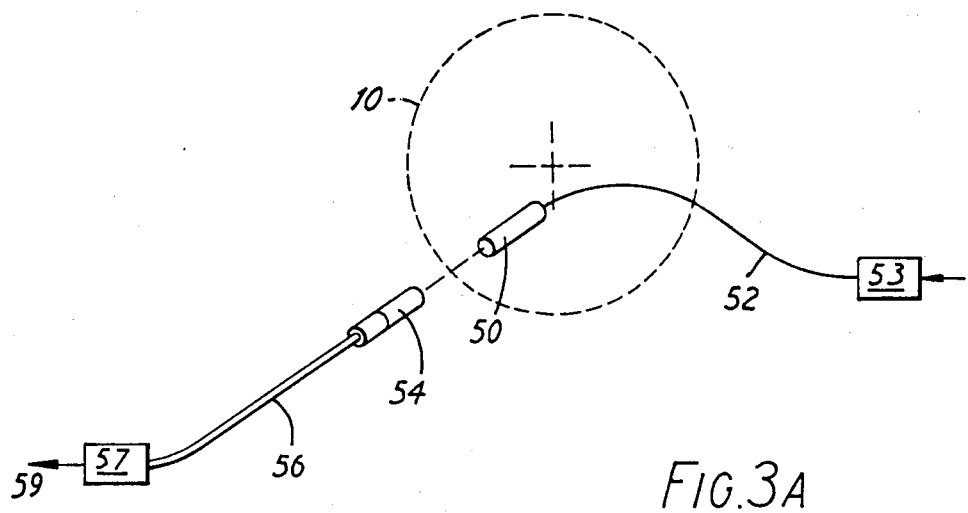
FIG. 3A shows one possible arrangement for sensing the vertical displacement of the upper electrode wheel of the apparatus shown in FIG. 1.

FIG. 3 illustrates two methods which may be used for generating the signal dependent on the position of the upper electrode wheel 10. In FIG. 3A a light source 50 energised through an electric cable 52 from an electric supply 53 generates a horizontal light beam which is directed at the periphery of the wheel 10 at a site 44 or 46 as previously described. A light collector 54 receives the unobstructed part of the beam and passes a signal which is a function of the received light along a fibre optic cable 56 to a receiving device 57, the device 57 accordingly generates on an output line 59 an electrical signal which is a function of the position of the wheel 10.

The light source 50 and collector 54 are suitably mounted on the machine frame one on each side of the wheel 10. Advantageously, where the site 44 is used, the width of the optical slit 44 (FIG. 1) is made even smaller by a mask attached to the z-bar at the surface 42, as is represented in FIG. 1 by the broken lines and denoted by the reference numeral 58; in this way the sensitivity of the measurement can be increased.

Figure 3B:
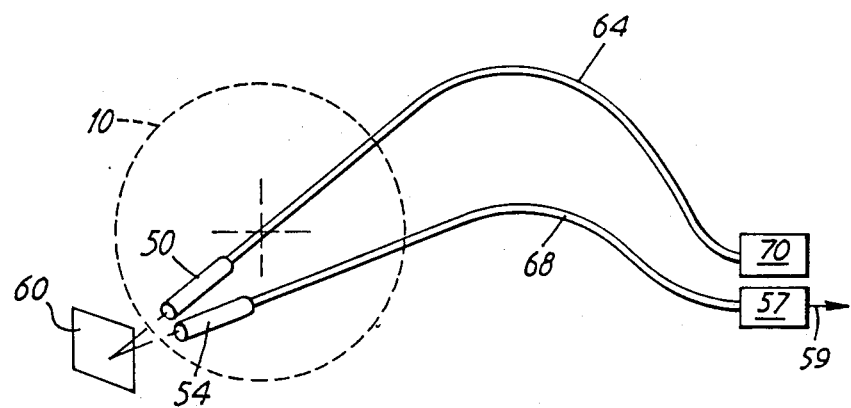
FIG. 3B similarly shows a second possible arrangement for sensing the vertical displacement of the upper electrode wheel.

FIG. 3B shows an alternative and preferred arrangement in which a light beam is generated and received on the same side of the wheel 10, a mirror 60 being provided on the opposite side of the wheel for reflecting the beam back to the receiver. In this embodiment the light source 50 is an end termination of an incoming fibre optic cable 64; likewise, the light collector 54 is an end termination of a return fibre optic cable 68. The light source 50 and collector 54 may advantageously be arranged closely adjacent one another in a common housing. The cables 64, 68 are terminated at their other ends at light generating and receiving devices 70, 57 which may be located at a remote location of the machine where they are not susceptible to damage. An electrical signal dependent on the position of the wheel 10 is produced by the light receiver 57 on an output line 59.

Figure 4A:
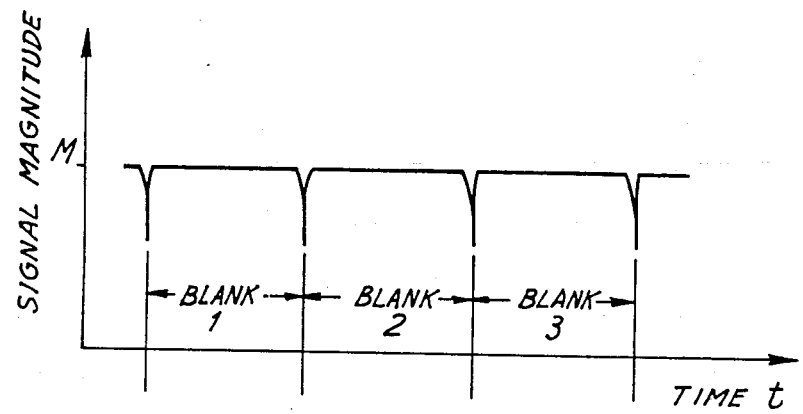
FIG. 4A shows the position-dependent signal as it would ideally appear for three successive blanks.

FIG. 4A shows the ideal output signal produced by the receiver 57 in response to three sequential blanks 26 which are seam-welded by the apparatus. The blanks are separated by small distances which appear as interruptions in the waveform, but it will be seen that otherwise the signal is constant and at a predetermined ideal magnitude M.

In practice, however, the thickness of a seam being welded is not constant, and the waveform for each can will fluctuate to a greater or lesser degree as welding proceeds, in addition, if insufficient or excessive electrical energy is supplied to the weld the latter will be correspondingly excessively thick ("cold weld") or excessively thin ("hot weld"), and the magnitude of the position-dependent signal will accordingly be too large or too small.

FIG. 4B again shows the position-dependent signal for three successive blanks, but this time the signal includes the effects of various possible faults which may result in substandard or faulty cans. The waveform for Blank 1 thus provides at 80 evidence of a folded-back corner of one of the margins 28, 30 at the leading end of the blank, and at 82 of a notched edge of a margin; the waveform for Blank 2 shows evidence of more extensive edge damage of a margin at 84; and the waveform for Blank 3 shows evidence of seam taper at 86, that is to say, progressive reduction or increase in the seam thickness from one end to the other.

Figure 4B:
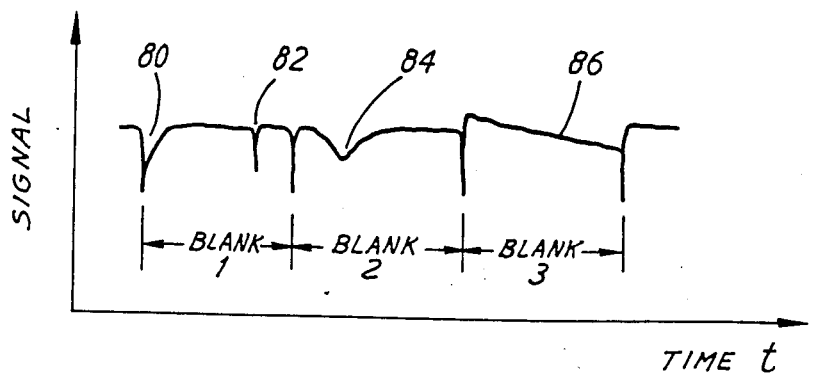
FIG. 4B likewise shows the position-dependent signal for three successive blanks which are subject to various typical faults.

Not illustrated in FIG. 4B is the effect of cold or hot weld on the position-dependent signal, but it will be understood that a fault of this kind will cause in FIG. 4B a corresponding overall vertical shift of the waveform in the appropriate direction.

Figure 5:
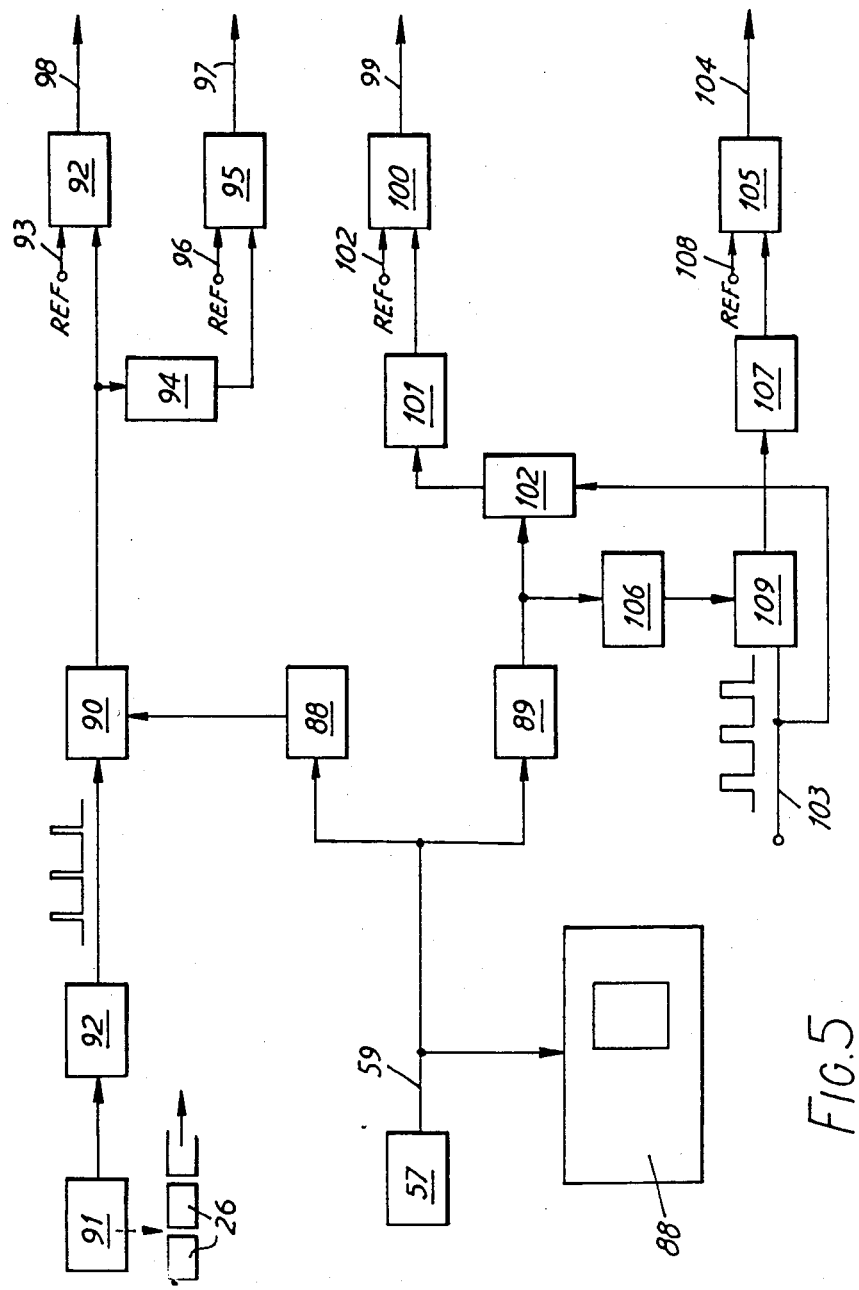
FIG. 5 shows an electrical circuit proposed for receiving and processing the position-dependent signal derived in accordance with FIGS. 1 to 3.

FIG. 5 is a block circuit diagram of a circuit connected for receiving the position-dependent electrical signal from the receiver 57 (FIG. 3) and arranged for deriving various output signals in dependance upon the welding faults detected. The signal is passed along line 59 and thence, in parallel, to a high pass filter 88 and a low pass filter 89.

The duration of the welding cycle for one blank is approximately 100 mS, which is the time taken for the blank to pass between the electrode wheels 10, 12. The high pass filter 88 is designed to pass pulses having a duration of less than approximately 5 mS that is to say, approximately 5% of the weld cycle time. This includes the pulses indicative of the inter-blank gaps as shown in Fig. 4A, and in order to prevent these particular pulses from being mistaken as faults, the pulse train from the filter 88 is passed to a gating circuit 90 by which the gap-indicative pulses are supressed in response to blanking pulses derived from a can gap sensor 91 disposed to the near vicinity and upstream of, the electrode wheels 10, 12. For clarity, the sensor 91 is not shown in FIG. 1. A delay circuit 92 between the sensor 91 and the gating circuit 90 delays the blanking pulses in accordance with the time taken for a gap, as sensed by the sensor, to move from the sensor to the weld location.

After modification by the gating circuit 90 the pulse train from the high pass filter 88 is compared in a comparator 92 with a reference value entered on a line 93. It is also passed to a filter 94 which passes only the relatively long duration pulses of the pulse train, that is to say, those having a duration of more than 2 mS (or 2% of the weld cycle time). These latter pulses are compared in a further comparator 95 with a further reference value entered on line 96. It is to be noted that the reference value on line 96 is substantially smaller than that on line 93.

On receipt of a pulse from the filter 94 having a magnitude greater than the reference value on line 96 the comparator 95 produces a signal on an output line 97 in response to which the blank is rejected, by means not shown, after leaving the electrode wheels. In this way blanks which are marred by the particular faults 80 and 84 previously discussed in relation to FIG. 4B are identified and rejected.

Likewise, a signal in response to which the respective blank is rejected appears on an output line 98 whenever the comparator 92 receives a pulse having a magnitude greater than the reference value on line 93. In this way blanks marred by a notched or similar edge - e.g. fault 82 of FIG. 4B - are identified and rejected. The relatively high reference value entered on line 93 is for discrimination against small magnitude, high frequency, pulses corresponding to minor but acceptable imperfections of the blank being monitored.

The low pass filter 89 is designed to pass pulses having a duration of greater than 10 mS, that is to say, approximately 10% of the weld cycle time. Two output signals are derived for control/monitoring purposes from the filter 89 output. The first output signal is generated on a line 99 by a comparator 100 when the filter 89 output, as averaged over each weld cycle by an averaging circuit 101, exceeds a reference value entered by the operator on a line 102 as an input to the comparator 100. The output signal on line 99 is accordingly indicative of "hot weld" or "cold weld" blanks as previously discussed, and in response to it the identified blanks are rejected. Thus, an output signal generated on any one or more of the lines 97, 98 and 99 will result in automatic rejection of the blank in question.

In order to prevent normal end effects at the beginning and end of each weld cycle from causing an output signal to be generated on line 99 for blanks which are nevertheless within acceptable tolerance limits, a gating circuit 102 is inserted between the low pass filter 89 and the averaging circuit 101 and arranged to repress the signal from filter 89 when the end effects are present. This repression by the gating circuit 102 is in response to relatively long duration blanking pulses which are centered in time relation on the gaps between the blanks, and which are fed to the gating circuit on an input line 103. The blanking pulses may conveniently be obtained from the automatic sequence control of the welding machine.

The second output signal generated from the output of the low pass filter 89 is generated on an output line 104 by a comparator 105 whenever the signal from filter 89, as differentiated by a differentiating circuit 106 and averaged over each weld cycle by an averaging circuit 107, exceeds a reference value set on an input line 108 to the comparator 105. A gating circuit 109, equivalent in effect to the gating circuit 102 and fed with the blanking pulses from line 103, likewise prevents the generation of spurious output signals on line 104 because of end effects.

By virtue, in particular, of the differentiating circuit 106, the subcircuit comprising the circuit items 105 to 109 detects seams which vary progressively in thickness along their length, responsively producing an output signal on line 104. Such "tapered" seams are primarily caused by incorrect setting-up of the machine by the operator, and providing that an output signal is not correspondingly produced on a line 97, 98 and/or 99 - in which case the blank will be rejected - the taper fault will be within acceptable tolerance limits. The signal on line 104 is therefore used to deliver a warning to the operator that an appropriate adjustment of the machine may be desirable.

Referring again to FIGS. 1 to 3, two sites (44, 46) are proposed there at which to detect displacement of the upper electrode wheel 10. Other sites, however, are possible at either the lower part or the upper part of the wheel 10 periphery. As previously mentioned, sites on the lower periphery have the advantage that the position-dependent signal can be substantially unaffected by variations in thickness of the electrode wire 36A. However, those sites are necessarily offset around the wheel periphery from the lower-most point of the wheel 10 so that the displacement of the wheel detected by the sensor 54 will be related by a sine function to the actual vertical displacement of the wheel 10 which occurs. This introduces a non linearity into the relationship of the wheel displacement to the output signal produced, but Applicants believe that a site 44 on the bottom periphery of the wheel 10 may, in relation to the vertical through the axis 14, usefully lie within a range of angular displacements of 20° to 50° on the upstream side of the weld location, and within a range of angular displacements of 20° to 50° on the downstream side of the weld location. Preferably, as described, the site 44 is located on the upstream side where the z-bar 38 is available to define an optical slit.

On the upper periphery of the wheel 10 the sensing site 46 is preferably located at the uppermost point of the wheel as shown, so as to avoid the introduction of any sine function as mentioned in the preceding paragraph. Other sites, however, are possible; these may lie within a range of angular displacement of from 0° to 20° on the upstream, left hand, side of the particular site 46 shown, and within the same range of angular displacements, but within the electrode wire 36A, on the downstream, right hand side of that site 46. If desired, means may be provided to define an optical slit for a site 46 similar to that defined by the z-bar 38 for the site 44 as shown in FIG. 1.

The invention is not to be considered as restricted to the use of light as the sensing medium as particularly described; other forms of electromagnetic radiation may be used, such, for example, as radio waves.

Although of particular application to the particular resistance welding apparatus specifically described and shown in FIG. 1 the invention may be used in relation to other resistance welding apparatus. As with the described arrangement, the position-dependent output signal may be used to achieve open and/or closed loop process control, for rejecting substandard or faulty blanks, and/or indication purposes. It may be processed by a circuit other than the circuit shown in FIG. 5.

Whilst the invention has been described in terms of an upper electrode wheel and a lower rotatable electrode wheel the lower electrode wheel may, if desired, be replaced by a solid block as is described in our copending British patent Application No. 86 30157.

It will be understood that the metal blanks are of substantially constant chosen thickness t so that comparison of the signals, arising at the weld which is typically mash welded to about 1.5 t, with the blank metal thickness chosen gives useful control data.

While a presently preferred embodiment of the present invention has been illustrated and described, modifications and variations thereof will be apparent to those skilled in the art given the teachings herein, and it is intended that all such modifications and variations be encompassed within the scope of the appended claims.

We claim:

1. Resistance welding apparatus for welding a workpiece arranged to be displaced along a predetermined path, said apparatus comprising:
    a pair of cooperating electrodes;
    means mounting said electrodes on opposite sides of said path;
    means urging the electrodes towards one another;
    a gap defining member;
    means mounting the gap defining member in a fixed positional relationship with one said electrode and located facing the outer surface of the other electrode to define a gap between the said outer surface and the gap defining member, the said outer surface being faced, being inclined to a line extending perpendicular to the path where said outer surface passes between the electrodes whereby the size gap will vary as a function of the instantaneous thickness of the workpiece between the electrodes; and
    monitoring means for monitoring the size of said gap and thereby the thickness of said workpiece.

2. Apparatus according to claim 1 wherein the inclination of the surface to the said line lies in the range of from 40° to 90°.

3. Apparatus according to claim 1 wherein the said surface being faced extends substantially parallel to the path between said electrodes.

4. Apparatus according to claim 1 wherein at least one of said electrodes comprises a rotary wheel.

5. Apparatus according to claim 1 including a travelling sacrificial wire arranged to engage the workpiece at least one of said electrodes defining a path for said wire.

6. Apparatus according to claim 5 wherein said wire passes through the gap to reduce the dimensions of the size of the gap accordingly and thereby render variations of the residual gap independent of variations in thickness of the wire.

7. Resistance welding apparatus comprising
    first and second mutually co-operable electrodes, said first electrode being arcuate and the second electrode a rotary wheel,
    means mounting said first electrode immovable in bodily position,
    means mounting said second electrode for guided movement towards and away from the first electrode, and
    means for sensing the displacement of the periphery of the second electrode at a position where the periphery is inclined to the direction of movement of the second electrode and for generating a signal which is a function of the relative displacement between the electrodes and therefore also a function of weld thickness present between the electrodes.

8. Apparatus according to claim 7 wherein said position lies adjacent the point of cooperation between the electrodes.

9. Apparatus according to claim 7 wherein said position lies remote from the point of cooperation between said electrodes.

10. Apparatus according to claim 7 wherein the immovable electrode comprises a solid block.

11. Apparatus according to claim 7 wherein the means for sensing displacement of the periphery of the second electrode comprises
   a light source located laterally of the electrode periphery, and
   a light collector to receive such light as is permitted by the second electrode.

12. Apparatus according to claim 11 wherein the light collector is a terminal portion of a fibre optic cable connecting said collector to a receiving device which generates an electrical signal representative of the position of the periphery of the second electrode.

13. Apparatus according to claim 7 wherein the means for sensing displacement of the periphery of the second electrode comprises
   a light source
   a light collector
   means mounting the light source and the collector laterally to one side of the second electrode, and
   a mirror mounted laterally to the other side of the second electrode to reflect light received from the light source and permitted by the second electrode back into the light collector.

14. Apparatus according to claim 13 wherein the light collector feeds a receiving device which generates an electrical signal.

15. Apparatus according to claim 14 including a high pass filter, a low pass filter, and means connecting the high pass filter and the low pass filter in parallel whereby the electrical signal is passed, in parallel to the high pass filter and low pass filter.

16. Apparatus according to claim 15 comprising
   means for feeding sucessive can bodies to be welded between the first and second electrodes,
   a sensor for sensing the presence of can bodies as they pass along a path to the electrodes, and
   gating means responsive to the sensor for suppressing those parts of the output signal of the receiving device indicative of gaps between the cans.

17. Apparatus according to claim 15 comprising
   a comparator for comparing the signal from the high pass filter with a reference value to provide an indication when an excessive weld thickness indicative of inadequate fusion has occurred.

18. Apparatus according to claim 15 comprising a further comparator for comparing the signal from the low pass filter with a further reference value to provide an indication where a thin or discontinuous weld has occurred.

19. Resistance welding apparatus comprising first and second mutually co-operable electrodes, said first electrode being arcuate and the second electrode a rotary wheel;
   means mounting said second electrode for guided movement towards and away from the first electrode;
   a light source located laterally of the periphery of the second electrode to direct light towards a position where the periphery is inclined to the direction of movement of the second electrode; and
   a light collector located on the opposite side of the second electrode from the light source to receive light and in a position where light from the light source directed at light collector is partially eclipsed by the second electrode, the collector thereby generating a signal which is a function of the relative displacement between the electrodes and therefore also a function of weld thickness present between the electrodes.

* * * * *